United States Patent
Aleotti et al.

(10) Patent No.: US 10,429,519 B2
(45) Date of Patent: Oct. 1, 2019

(54) SYSTEM AND A RELATIVE METHOD FOR DETECTING POLLUTING SUBSTANCES USING A REMOTELY PILOTED VEHICLE FROM A HAPTIC COMMAND DEVICE

(71) Applicants: UNIVERSITÀ DEGLI STUDI DI PARMA, Parma (IT); CONSIGLIO NAZIONALE DELLE RICERCHE, Rome (IT)

(72) Inventors: Jacopo Aleotti, Suzzara (IT); Stefano Caselli, Reggio Emilia (IT); Giorgio Micconi, Fontanellato (IT); Giacomo Benassi, Reggio Emilia (IT); Nicola Zambelli, Scandiano (IT); Andrea Zappettini, Reggio Emilia (IT); Davide Calestani, Parma (IT)

(73) Assignees: UNIVERSITA DEGLI STUDI DI PARMA, Parma (IT); CONSIGLIO NAZIONALE DELLE RICERCHE, Rome (IT)

( * ) Notice: Subject to any disclaimer, the term of this patent is extended or adjusted under 35 U.S.C. 154(b) by 0 days.

(21) Appl. No.: 15/763,985

(22) PCT Filed: Sep. 19, 2016

(86) PCT No.: PCT/IB2016/055571
§ 371 (c)(1),
(2) Date: Mar. 28, 2018

(87) PCT Pub. No.: WO2017/055962
PCT Pub. Date: Apr. 6, 2017

(65) Prior Publication Data
US 2018/0217272 A1    Aug. 2, 2018

(30) Foreign Application Priority Data
Sep. 28, 2015    (IT) ................. 102015559080

(51) Int. Cl.
*G01T 1/169*    (2006.01)
*G01T 7/00*    (2006.01)
(Continued)

(52) U.S. Cl.
CPC ............ *G01T 1/169* (2013.01); *G01T 7/00* (2013.01); *G01V 5/02* (2013.01); *G05D 1/005* (2013.01);
(Continued)

(58) Field of Classification Search
CPC .......... G01T 1/169; G01T 7/00; G05D 1/005; G01V 5/02; B64C 2201/12; B64C 2201/146
(Continued)

(56) References Cited

U.S. PATENT DOCUMENTS

2004/0090318 A1* 5/2004 Rothkop ............... B60Q 9/008
340/435

FOREIGN PATENT DOCUMENTS

| CA | 3011006 A1 * | 8/2017 | ............ B62L 3/02 |
| DE | 102012108179 A1 | 12/2013 | |
| WO | 2014140536 A1 | 9/2014 | |

OTHER PUBLICATIONS

Gorski J et al., "Sensor network assisted teleoperation" Advanced Intelligent Mechatronic, pp. 652-657, (Jul. 2005).
(Continued)

*Primary Examiner* — Marcus H Taningco
*Assistant Examiner* — Gisselle M Gutierrez
(74) *Attorney, Agent, or Firm* — Browdy and Neimark, PLLC

(57) ABSTRACT

A system (10) for the remote detection of substances, comprising a vehicle (20) that is mobile in space and remote-piloted using a control device (40) with a haptic interface suitable to return a force feedback to a user of the
(Continued)

control device (40), wherein the vehicle (20) is equipped with a position sensor (22) and a sensor (21) for detecting a physical quantity whose intensity depends on the distance of at least one substance present in a detection point located in a vicinity of the position of the vehicle (20).

16 Claims, 1 Drawing Sheet

(51) Int. Cl.
    *G01V 5/02*     (2006.01)
    *G05D 1/00*     (2006.01)

(52) U.S. Cl.
    CPC .... *B64C 2201/12* (2013.01); *B64C 2201/146* (2013.01)

(58) Field of Classification Search
    USPC ...................................................... 250/336.1
    See application file for complete search history.

(56) References Cited

OTHER PUBLICATIONS

Lin Hsien-I et al.,"Search strategy of a mobile robot for radiation sources in an unknown environment", 2014 International Conference on Advanced Robotics and Intelligent Systems (ARIS), p. 56-60 (Jun. 2014).

\* cited by examiner

SYSTEM AND A RELATIVE METHOD FOR DETECTING POLLUTING SUBSTANCES USING A REMOTELY PILOTED VEHICLE FROM A HAPTIC COMMAND DEVICE

TECHNICAL FIELD

The present invention regards a system for detecting polluting substances, for example radioactive substances or chemical contaminants, and the localisation thereof.

More in particular, the invention regards a system for detecting polluting sources, for example radioactive sources or chemical contaminants, and localisation thereof by means of a vehicle, preferably a remote-piloted air vehicle.

PRIOR ART

Remote-piloted vehicles, for example unmanned air vehicles, which are equipped with a position sensor and a radiation detection sensor, are known. An example of such prior art vehicles is described in the international patent application WO2014140536, which shall be deemed incorporated herein for reference.

However, such vehicles are remote-piloted so as to scan an area to be subjected to inspection, for example by covering a flight path remote-piloted by a pilot using guide devices according to trajectories that, for example, the pilot plans and programmes in advance.

Thus, especially if the area to be subjected to inspection is quite extensive, the air vehicle—which has a flight range limited by the duration of the charge level of the driving unit—is forced to scan the area on several flights or, if the flight plan is not programmed by highly qualified personnel, that defines some areas of high radioactivity to be subjected to a more thorough inspection by the air vehicle, there lies the risk of some areas to be inspected being flown over quickly by the air vesicle which will thus not scan the area accurately.

An object of the present invention is to overcome the aforementioned drawbacks of the prior art through a solution that is simple, rational and inexpensive.

Furthermore, an object of the invention is to assist the operator to rapidly take the air vehicle to the area with high concentration of polluting substances or with high radioactivity thus helping the user to focus research on areas of greater interest and improve the exploration of the area before leaving it to move to other areas.

Still, an object of the invention is to attain such results of accurately scanning the area to be subjected to inspection while simultaneously minimising the times of use of the system.

These objects are attained by the characteristics of the invention, which are outlined in the independent claim. The dependent claims outline preferred and/or particularly advantageous aspects of the invention.

DESCRIPTION OF THE INVENTION

Particularly, the invention provides a system for the remote detection of substances, comprising a vehicle that is mobile in space and remote-piloted using a control device with a haptic interface suitable to return a force feedback to a user of the control device, wherein the vehicle is equipped with a position sensor and a sensor for detecting a physical quantity (which detects the presence) of at least one substance present in a detection point located in a vicinity of a position of the vehicle.

This solution enables a more efficient piloting of the vehicle in the area to be subjected to monitoring and/or inspection for the presence of polluting and/or radioactive substances.

In addition, an aspect of the invention provides for that the system comprises an electronic control unit operatively connected to the position sensor, to the detection sensor and the control device and configured so as to carry out a detection cycle which comprises steps of:
  measuring a value of a physical quantity of the substance at the detection point;
  determining a force feedback modulus to be returned to a user of the control device by means of a haptic interface on the basis of the value of the measured physical quantity; and
  controlling the control device to return the force feedback with the determined modulus.

Thus, as a function of the value of the physical quantity of the substance measured and detected (which depends on the presence and the distance of the substance of interest) at the given detection point, the operator may have a force feedback and be urged to inspect the area of greater interest, i.e. the area where the polluting and/or radioactive substance is detected, further.

A further aspect of the invention provides for that the detection cycle carried out by the electronic control unit may also comprise the steps of:
  comparing the value of the measured physical quantity with a threshold value thereof:
  if the value of the physical quantity is greater than the threshold value, setting the position of the vehicle corresponding to the detection point where the value of the physical quantity was measured as a reference position and defining an area of the space containing the reference position and a current position of the vehicle; and
  controlling the control device to return a force feedback with non-zero modulus for positions of the vehicle comprised within the defined area.

Thanks to this solution the haptic interface has an attractive effect on the vehicle with respect to the detection point, so that the user is urged by the haptic interface to maintain the vehicle in proximity of the flight point subject of observation of a value of physical quantity greater than the threshold value, basically leading the operator to pilot the vehicle in a smart manner in the area surrounding the detection point.

Another aspect of the invention provides for that the electronic control unit, at every detection cycle, be configured so as to update the threshold value with the measured value of the physical quantity if the measured value of the physical quantity is greater than the threshold value.

Thanks to this solution, the piloting trajectory of the vehicle is affected by the haptic interface so that it allows an easy approaching to a detection point where the value of the physical quantity of the polluting and/or radioactive substance is greater with respect to the previously detected one, basically making the definition of the piloting trajectory of the vehicle more effective and the scanning of the area to be subjected to monitoring and/or control more efficient.

Advantageously, the non-zero modulus of the force feedback is a function that increases as the distance increases, i.e. it can be proportional to the distance or, preferably, the square of the distance of the current position from the set reference position.

Thanks to this solution, the haptic interface will offer a progressively increasing force feedback in the modulus as the vehicle tends to move away from the determined reference point, up to a maximum pre-established value.

Advantageously, the force feedback modulus is zero at the set reference position.

In addition, the force feedback modulus is zero at the positions of the vehicle found outside the defined area.

Thanks to this solution, for example, should one want to leave the detection area with the vehicle, all that is needed is to overcome the force feedback emitted by the haptic interface and operate the vehicle outside the defined area without further resistance from the haptic interface.

A further aspect of the invention, for the same purposes illustrated above, provides a method for the remote detection of substances using a detection system provided with a vehicle that is mobile in space and remote-piloted using a control device with a haptic interface suitable to return a force feedback to a user of the control device, wherein the vehicle is equipped with a position sensor and a sensor for detecting a physical quantity (which depends on the presence and the distance of the substance of interest) of at least one substance present in a detection point located in a vicinity of a position of the vehicle, wherein the method comprises carrying out a detection cycle which comprises steps of:

measuring a value of such physical quantity of a substance at the detection point;

determining a force feedback modulus to be returned to a user of the control device by means of a haptic interface on the basis of the value of the determined physical quantity; and controlling the haptic interface to return the force feedback with the determined modulus.

Advantageously, the detection cycle may comprise the steps of:

comparing the value of the measured physical quantity with a threshold value thereof;

if the value of the physical quantity is greater than the threshold value, setting the position of the vehicle corresponding to the detection point where the value of the physical quantity was measured as a reference position and defining an area of the space containing the reference position and a current position of the vehicle; and controlling the control device to return a force feedback with non-zero modulus for positions of the vehicle comprised within the defined area.

In addition, at each detection cycle, the method could comprise the step of updating the threshold value with the measured value of the physical quantity if the measured value of the physical quantity is greater than the threshold value.

Preferably, the non-zero value of the force feedback modulus may be a function that increases as the distance increases, preferably, the square of the distance of the current position from the set reference position.

For example, the method could comprise the step of calculating the feedback force modulus through the following formula:

$$f = \frac{\zeta}{\|r-u\|} \begin{bmatrix} 0 & 1 & 0 \\ 0 & 0 & -1 \\ -1 & 0 & 0 \end{bmatrix} \begin{bmatrix} \beta & 0 & 0 \\ 0 & \beta & 0 \\ 0 & 0 & 0 \end{bmatrix} \begin{bmatrix} r_x - u_x \\ r_y - u_y \\ r_z - u_z \end{bmatrix},$$

wherein, f is the feedback force modulus, $\zeta$ is a selection value, $\beta$ is a correlation function, r is the reference position of coordinates $(r_x, r_y, r_z)$ and u is the current position of the vehicle of coordinates $(u_x, u_y, u_z)$.

Advantageously, the correlation function $\beta$ could be obtained from the following equation:

$$\beta = \frac{f_{max}}{L^2} d^2(r, u)_{xy}$$

wherein $f_{max}$ is a predetermined maximum value of the feedback force modulus, $d(r,u)_{x,y}$ is the distance of the current position of the vehicle from the set reference position, L is a predetermined constant.

The selection value $\zeta$ could also be set according to the following condition:

$$\zeta = \begin{cases} 0 & se\ d(r, u)_{xy} > L \\ 1 & se\ d(r, u)_{xy} \leq L \end{cases}.$$

BRIEF DESCRIPTION OF THE DRAWINGS

Further characteristics and advantages of the invention will be apparent from reading the flowing description—provided by way of non-limiting example—with reference to the figures illustrated in the attached drawings.

BEST EMBODIMENT OF THE INVENTION

Figure 1:
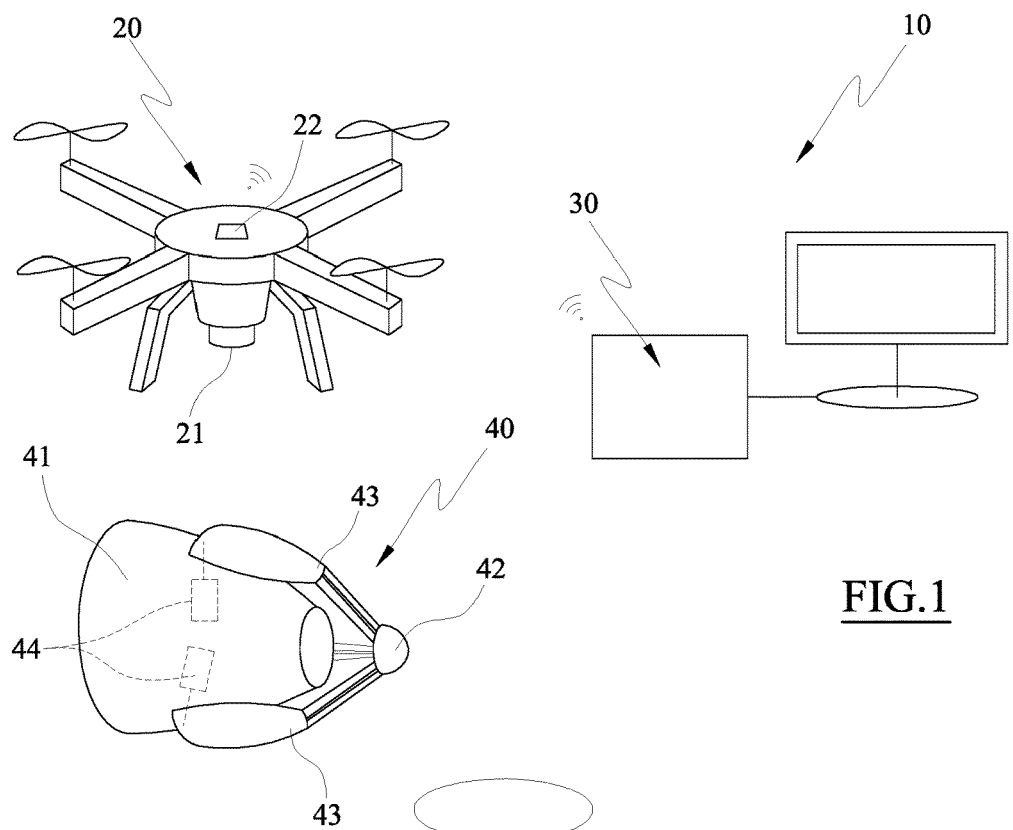
FIG. 1 is a schematic diagram of a detection system according to an embodiment of the invention.
Figure 2:
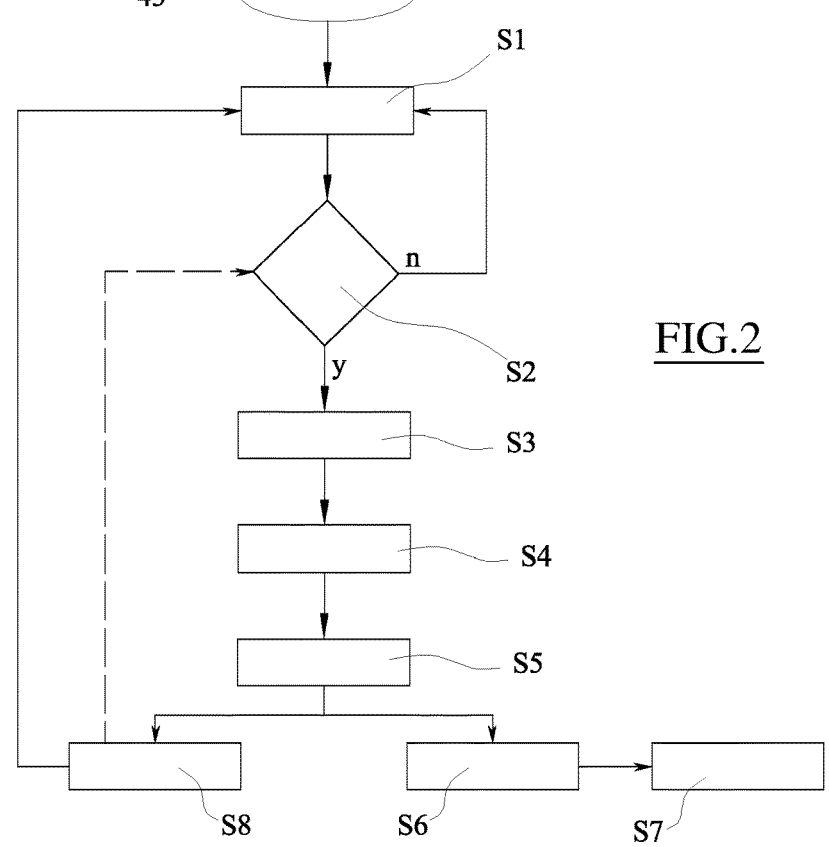
FIG. 2 is a flow chart of a detection system according to an embodiment of the invention.

With particular reference to such figures, a system for detecting polluting and/or radioactive substances is indicated in its entirety with 10.

The system 10 may be used in contexts such as the ones listed below in an exemplifying but non-exhaustive list, including:

environmental decontamination following a radioactive fall-out caused by a nuclear accident or war event;

monitoring nuclear power plant sites;

monitoring areas suspected of having environmental contamination (e.g. illegal disposal sites);

periodical monitoring of waste disposal sites to ensure quality environment for the citizens;

monitoring industrial storage sites with contamination potential, such as depots for ferrous material, wood material, or building material in general.

The system 10 comprises an unmanned vehicle, preferably an unmanned air vehicle 20. However, it cannot be ruled out that the vehicle can be of the land or floating or submarine vehicle type.

The air vehicle 20 comprises a driving unit and remote activatable piloting means, as better described hereinafter.

The air vehicle 20 is equipped with a detection sensor 21, which can be mounted on the air vehicle 20, for example so as to be vertically faced downwards. The detection sensor 21 is suitable to detect/measure a physical quantity C whose intensity depends on the distance from the substance (i.e. it decreases on the detection point where the substance is present).

The detection sensor 21 is for example a radiation sensor in solid state, for example an X-ray (or gamma ray) sensor for detecting a physical quantity C, i.e. a radiation intensity, of a substance (polluting or radioactive) present in a detection point positioned in the proximity of the detection sensor 21 and thus the air vehicle 20.

The detection point is for example defined along a radius of action of the detection sensor, for example at the point of intersection of the ground with the radius (vertical) of action of the detection sensor 21.

Alternatively, the detection sensor 21 could be a sensor suitable to detect the concentration of a chemical substance (organic or inorganic), the detected physical quantity C possibly being the concentration of the substance, for example a polluting substance, in this case.

The air vehicle 20 is also equipped with a position sensor 22 for establishing a current position u of the air vehicle 20.

The position sensor 22 may be any device suitable to provide information regarding the position of the position sensor 22. Thus, the current position u of the air vehicle 20 can be established from this position. Preferably, the position sensor 22 provides three position coordinates ($u_x, u_y, u_z$). The position sensor 22 may comprise a global positioning system (GPS) for providing the horizontal position coordinates $u_x$ and $u_y$, for example within +/−2 m of tolerance, and a device for measuring the differential pressure to provide the vertical position coordinate $u_z$ (altitude), for example within +/−1 cm of tolerance. The system 10 further comprises an electronic control unit 30.

The electronic control unit 30 is operatively connected to the detection sensor 21 and to the position sensor 22, so as to receive the signals detected and processed by it.

The electronic control unit 30 is for example arranged in a remote position with respect to an air vehicle 20 and it is suitable to receive/transmit—through suitable means for transceiving signals and/or data—the signals and/or data detected by the sensors 21,22 in real time, for example, in wireless mode; in this case, the air vehicle 20 is provided a signal transceiver connected to the sensors 21,22.

It cannot be ruled out that the electronic control unit 30 can be arranged on board the air vehicle 20 and communicate, through a suitable transmitter, the processed data to a remote control station.

The electronic control unit 30 for example comprises a processor (or microprocessor) and a memory.

The electronic control unit 30 is configured to receive information regarding the current position u from the position sensor 22. The processor of the electronic control unit 20 is configured to periodically associate the current position data u coming from the position sensor 22 with data regarding the measured values of the physical quantity C (of the radioactive and/or polluting substance or a substance to be monitored in any case) coming from the detection sensor 21 to create the combined data representing the physical quantity C at the detection point. The combined data may be created any time the detection sensor 22 is read. Preferably, the processor may be configured to associate the current position data u with data regarding the measured values of the physical quantity C at least once per second, preferably once every 500 ms and more preferably approximately once every 100 ms. The system 10 also comprises a control device 40 configured to remote-pilot the air vehicle 20.

The control device 40 can for example be held by an operator in a remote position with respect to the current position u of the air vehicle 20.

The control device 40 for example comprises a haptic interface configured to return a force feedback to a user of the control device.

The control device 40 may be of the type described in patent no. EP1690652, which shall be deemed incorporated hereto for reference, and known under the trade name NOVINT FALCON.

In particular, the control device 40 according to the preferred embodiment comprises a base element 41 and a mobile element 42 (which can be held by the operator). The base element 41 and the mobile element 42 are connected through three kinematic chains 43.

Every kinematic chain 43 comprises a first arm (main) and a second arm (secondary).

Every second arm may be considered to be a parallelogram including two connection rods. Every connection rod is coupled, at an end thereof, with the mobile element 42 by means of a joint or hinge. Each connection rod is coupled, at the opposite end thereof, with an end of the first arm by means of a joint or hinge.

Each second arm, in particular each connection rod, has two degrees of freedom rotational on both ends. In order to provide this functionality, the coupling of the second arms to the mobile element 42 and the relative first arms may be obtained using cardan elements or parallel or non-parallel pairs of connection or rotational articulations, such as ball bearings, sliding bearings or flexible hinges.

Alternatively, each second arm, in particular each connection rod, may have three degrees of freedom rotational on both ends. In order to provide this functionality, the coupling of the second arms to the mobile element 42 and the relative first arms may be obtained by means of ball joints at one or both ends At the end opposite to the end coupled with the relative arm, each first arm is coupled with a mounting element, which is in turn fixedly mounted on the base element 41. The mounting element and the base element may also be made of a single piece.

Each first arm is coupled with the relative mounting element thereof so that each first arm can be rotated or oscillated with respect to the mounting element and, thus, with respect to the base element 41 by means of a rotary shaft.

A rotary actuator 44 is mounted on each mounting element so as to rotate the first arm with respect to the mounting element and, thus, with respect to the base element 41.

Rotary actuators 44 may be, for example, DC standard motors or brushless motors.

Elements for detecting the angular position (not shown) of each first arm, such as potentiometers, optical encoders, magnetic encoders, are preferably associated to the output shafts or any other part of the rotary actuators 44 and they are suitable to provide angular information The rotary actuators 44 and the detection elements are operatively connected, for example by wireless means through a suitable transceiver or by means of a cable (for example USB), to the electronic control unit 30 and/or to a further control unit for piloting the air vehicle 20 (i.e. for controlling the control means and the driving unit of the air vehicle).

Basically, by holding the mobile element 42 and actuating it in the space surrounding the base element 41, the operator controls the movement of the air vehicle 20 to perform corresponding movements in the airspace.

The movement of the mobile element 42 is controlled by means of detection elements controlling the rotation imparted by the user to the single output shafts of the rotary actuators 44.

The rotary actuators 44 are configured to define the force feedback (i.e. a vector defined by a modulus f, by a direction and an orientation) to the user as outlined below.

Basically, the force feedback could be a force resistant to the movement imparted by the user to the mobile element 42 or an active force of the rotary actuators 44 such to push the mobile element (if released or countering the movement imparted by the user) towards a reference point of the space, for example an inoperative configuration of the mobile element 42.

The electronic control unit 30 is, for example, configured to established (calculate) the force feedback modulus f as described below and control the rotary actuators 44 of the control device 40 so as to apply the established force feedback modulus f to the mobile element 42 of the control device.

The air vehicle 20, for the detection purposes according to the present invention, may be defined as a level flight, i.e. at a constant height (altimetry), thus wherein the vertical position coordinate $u_z$ is equal to a constant (non-zero) for example pre-established by means of a preliminary study of the area to be flown over.

Once the vehicle 20 begins the flight for example over a pre-established detection area the electronic control unit 30 is configured to perform a plurality of detection cycles as described hereinafter.

For example, each detection cycle provides for that the electronic control unit 30 performs the step of measuring (block S1), by means of the detection sensor 21, a (first) value of the physical quantity C of a substance (radioactive or polluting) at the detection point, i.e. associated to the position r where the air vehicle 20 is located at the time of detection, as described above; according to the value of the physical quantity C, the electronic control unit 30 is configured to establish, for example calculate, a force feedback modulus f to be returned to the user of the control device 40 by means of the haptic interface.

More in detail, the electronic control unit 30 is configured to compare (block S2) the measured value of the physical quantity C with a threshold value thereof.

For example, at the first detection, the threshold value is set to the full radiation intensity perceivable at the flight height $u_z$, i.e. the full radiation of the ground perceivable at such flight height $u_z$; alternatively, the threshold value may be a value of the physical quantity (radiation intensity) greater than the value of full intensity radiation and deemed critical for such area.

Should the value of the physical quantity C be lower than the threshold value, the electronic control unit 30 is configured to repeat an additional detection cycle.

On the other hand, should the value of the physical quantity C be greater than the threshold value, the electronic control unit 30 is configured to set (block S3) the position r of the air vehicle 20 corresponding to the point of detection where such value of the physical quantity C was measured, as a reference position r. According to such reference position r, the electronic control unit 30 is configured to establish (block S4) an area (virtual) of the airspace of the air vehicle 20 containing the reference position r and the current position u of the air vehicle 20.

For example, the defined area may be a circle on the horizontal plane centred in the reference position r, in which the radius L of the circle is a constant pre-established, for example through pre-calibration operations, carried out at the experimental stage, and stored in the memory of the electronic control unit 30.

The defined area may for example be any desired geometric shape (for example flat and horizontal) containing the reference position r therein or on the perimeter thereof.

Thus, the electronic control unit 30 is configured to establish, for example calculate, (block S6) the force feedback modulus f to be returned to the user of the control device 30 by means of the haptic interface.

More in detail, the modulus f is calculated through the following formula:

$$f = \frac{\zeta}{\|r-u\|} \begin{bmatrix} 0 & 1 & 0 \\ 0 & 0 & -1 \\ -1 & 0 & 0 \end{bmatrix} \begin{bmatrix} \beta & 0 & 0 \\ 0 & \beta & 0 \\ 0 & 0 & 0 \end{bmatrix} \begin{bmatrix} r_x - u_x \\ r_y - u_y \\ r_z - u_z \end{bmatrix},$$

wherein, f is the force feedback modulus, $\zeta$ is a selection value, $\beta$ is a correlation function, r is the reference position of coordinates $(r_x, r_y, r_z)$ and u is the current position of the air vehicle 20 of coordinates $(u_x, u_y, u_z)$.

Advantageously, the correlation function $\beta$ is obtained from the following equation:

$$\beta = \frac{f_{max}}{L^2} d^2(r, u)_{xy},$$

wherein $f_{max}$ is a pre-established maximum value of the force feedback modulus, for example established through experimental activities and stored in the memory of the electronic control unit 30, $d(r,u)_{x,y}$ is the Euclidean distance solely regarding the coordinates x,y of the current position u of the air vehicle 20 from the set reference position r, L is the radius of the defined area.

The selection value $\zeta$, which is a value number selectively equal to 1 or 0, is set based on the following conditions:

$$\zeta = \begin{cases} 0 & se\ d(r, u)_{xy} > L \\ 1 & se\ d(r, u)_{xy} \le L \end{cases}.$$

Basically, the force feedback modulus f is a non-zero value proportional to the square of the distance of the current position u from the reference position r at any position of the air vehicle 20 within the defined area, except for the position coinciding with the reference position r, where the modulus f is equal to zero. In addition, the force feedback modulus f is zero at the positions of the air vehicle 20 found outside the defined area.

Thus, the electronic control unit 30 is configured to control (block S7) the rotary actuators 44 of the control device 40 to return—to the user—a force feedback with modulus f that is:

non-zero for the positions of the air vehicle 20 comprised in the defined area and different from the reference position r, and zero in the reference position r and outside the defined area.

At each detection cycle in which the measured value of the physical quantity C is greater than the threshold value, the electronic control unit 30 is configured, furthermore, to update (block S8) the threshold value by replacing it with the measured value of the physical quantity C.

Otherwise, i.e. in cases where the measured value of the physical quantity does not exceed the threshold value, the threshold value remains intact with respect to one established at the previous detection cycle.

Thus, at the subsequent detection cycle, the reference position r is changed only in case of measurement, by the detection sensor 21, of a value of the physical quantity C" greater than the previously measured value of the physical quantity C'.

The invention thus conceived is susceptible to numerous modifications and variants all falling within the inventive concept.

In addition, all details can be replaced by other technically equivalent elements.

Basically, the materials used as well as the shapes and contingent dimensions, may vary according to the needs without departing from the scope of protection of the claims that follow.

The invention claimed is:

1. A system for the remote detection of substances, comprising:
    a vehicle that is mobile in space;
    a position sensor mounted on the vehicle and configured to detect a current position of the vehicle;
    a detection sensor mounted on the vehicle and configured to detect a physical quantity of at least one polluting and/or radioactive substance present in a detection point located in the space where the vehicle moves in a vicinity of the current position of the vehicle, in such a way to detect, monitor or inspect the presence of the polluting and/or radioactive substance in the space where the vehicle moves on the basis of the detected physical quantity; and
    a control device configured to remotely pilot the vehicle, wherein the control device has a haptic interface suitable to return a force feedback to a user of the control device on the basis of the detected physical quantity.

2. The system according to claim 1, further comprising an electronic control unit operatively connected to the position sensor, to the detection sensor and the control device and configured so as to carry out a detection cycle which comprises steps of:
    measuring a value of a physical quantity of the substance at the detection point;
    determining a force feedback modulus to be returned to a user of the control device by a haptic interface on the basis of the value of the measured physical quantity; and
    controlling the control device to return the force feedback with the determined modulus.

3. The system according to claim 2, wherein the detection cycle further comprises the steps of:
    comparing the value of the measured physical quantity with a threshold value thereof;
    if the value of the physical quantity is greater than the threshold value, setting the position of the vehicle corresponding to the detection point where the value of the physical quantity was measured as a reference position and defining an area of the space containing the reference position and a current position of the vehicle; and
    controlling the control device to return a force feedback with non-zero modulus for positions of the vehicle comprised within the defined area.

4. The system according to claim 3, wherein at each detection cycle the electronic control unit is configured so as to update the threshold value with the measured value of the physical quantity if the measured value of the physical quantity is greater than the threshold value.

5. The system according to claim 2, wherein the non-zero modulus of the feedback force is a function that increases as the distance of the current position from the set reference position increases.

6. The system according to claim 2, wherein the modulus of the feedback force is zero in the set reference position.

7. The system according to claim 2, wherein the force feedback modulus is zero for positions of the vehicle located outside the defined area.

8. The system according to claim 1, wherein the vehicle is an unmanned air vehicle.

9. The system according to claim 1, wherein the detection sensor is an X-ray or gamma-ray sensor and the measured physical quantity is the radiation intensity of the substance.

10. A method for the remote detection of substances using a detection system, wherein the system comprises:
    a vehicle that is mobile in space;
    a position sensor mounted on the vehicle and configured to detect a current position of the vehicle;
    a detection sensor mounted on the vehicle and configured to detect a physical quantity of at least one polluting and/or radioactive substance present in a detection point located in the space where the vehicle moves in a vicinity of the current position of the vehicle, in such a way to detect, monitoring or inspecting the presence of the polluting and/or radioactive substance in the space where the vehicle moves on the basis of the detected physical quantity; and
    a control device configured to remotely pilot the vehicle, wherein the control device has a haptic interface suitable to return a force feedback to a user of the control device on the basis of the detected physical quantity;
    wherein the method comprises carrying out a detection cycle which comprises steps of:
    measuring a value of the physical quantity of the at least one polluting and/or radioactive substance at the detection point;
    determining a force feedback modulus to be returned to a user of the control device by the haptic interface on the basis of the value of the measured physical quantity; and
    controlling the control device to return the force feedback with the determined modulus.

11. The method according to claim 10, wherein the detection cycle comprises the steps of:
    comparing the value of the measured physical quantity with a threshold value thereof;
    if the value of the physical quantity is greater than the threshold value, setting the position of the vehicle corresponding to the detection point where the value of the physical quantity was measured as a reference position and defining an area of the space containing the reference position and a current position of the vehicle; and
    controlling the control device to return a force feedback with non-zero modulus for positions of the vehicle comprised within the defined area.

12. The method according to claim 11, further comprising, at each detection cycle, a step of updating the threshold value with the measured value of the physical quantity if the measured value of the physical quantity is greater than the threshold value.

13. The method according to claim 11, wherein the non-zero value of the feedback force modulus is a function that increases as the distance of the current position from the set reference position increases.

14. The method according to claim 12, which comprises a step of calculating the feedback force modulus through the following formula:

$$f = \frac{\zeta}{\|r-u\|} \begin{bmatrix} 0 & 1 & 0 \\ 0 & 0 & -1 \\ -1 & 0 & 0 \end{bmatrix} \begin{bmatrix} \beta & 0 & 0 \\ 0 & \beta & 0 \\ 0 & 0 & 0 \end{bmatrix} \begin{bmatrix} r_x - u_x \\ r_y - u_y \\ r_z - u_z \end{bmatrix},$$

wherein, f is the feedback force modulus, $\zeta$ is a selection value, $\beta$ is a correlation function, r is the reference position of coordinates $(r_x, r_y, r_z)$ and u is the current position of the vehicle of coordinates $(u_x, u_y, u_z)$.

15. The method according to claim 14, wherein the correlation function $\beta$ is given by the following equation:

$$\beta = \frac{f_{max}}{L^2} d^2(r, u)_{xy}$$

wherein $f_{max}$ is a predetermined maximum value of the feedback force modulus, $d(r,u)_{x,y}$ is the distance of the current position of the vehicle from the set reference position, L is a predetermined constant.

16. The method according to claim 14, wherein the selection value is set according to the following condition:

$$\zeta = \begin{cases} 0 & se\ d(r, u)_{xy} > L \\ 1 & se\ d(r, u)_{xy} \leq L \end{cases}.$$

* * * * *